Feb. 2, 1943. T. R. HARRISON 2,310,027
CONTROL SYSTEM
Filed Aug. 5, 1939 4 Sheets-Sheet 1

Inventor
THOMAS R. HARRISON
By George M. Mumshaup
Attorney

Feb. 2, 1943.  T. R. HARRISON  2,310,027
CONTROL SYSTEM
Filed Aug. 5, 1939  4 Sheets-Sheet 2

INVENTOR
THOMAS R. HARRISON
BY George W. Unvelamp
ATTORNEY

Feb. 2, 1943.　　　T. R. HARRISON　　　2,310,027
CONTROL SYSTEM
Filed Aug. 5, 1939　　　4 Sheets-Sheet 3

INVENTOR
THOMAS R. HARRISON
BY George W. Hemmingway
ATTORNEY

Feb. 2, 1943. T. R. HARRISON 2,310,027
CONTROL SYSTEM
Filed Aug. 5, 1939 4 Sheets-Sheet 4

INVENTOR
THOMAS R. HARRISON
ATTORNEY

Patented Feb. 2, 1943

2,310,027

UNITED STATES PATENT OFFICE 2,310,027

CONTROL SYSTEM

Thomas R. Harrison, Wyncote, Pa., assignor to The Brown Instrument Company, Philadelphia, Pa., a corporation of Pennsylvania Application August 5, 1939, Serial No. 288,498

9 Claims. (Cl. 236—1)

The present invention relates to measuring and control apparatus and more particularly to an instrument that will measure the value of a condition and give a signal and operate a control when the value of the condition and/or its rate tion reaches a predetermined point.

It is an object of my invention to provide an instrument having provisions for measuring the value of a condition in a space and actuating a signal or control when the value of that condition reaches a predetermined point.

It is a further object of my invention to provide an instrument which is responsive to the rate of change of the value of a condition and will actuate a signal or control means when the rate is changing at a dangerous pace. It is also an object of the invention to provide an instrument that will actuate both signal and control means when certain combinations of the value of and the rate of change of the condition being measured occur.

In some types of oil refining processes the oil being treated is forced through a catalyst chamber during one step in the process. During the treatment in the catalyst chamber a deposit is gradually placed over the catalyst, thus reducing its efficiency to a point to where the treated oil must be directed through another chamber. In order to again use the catalyst in the original chamber it is customary to burn the deposit from its surface by forcing hot air through the chamber, and during the burning the temperature may reach a point where the catalyst is harmed if the proper care is not exercised. In order to properly check the temperature in the chamber the rate at which it is rising must be taken into account as well as the actual temperature. If, for example, the temperature is comparatively near the danger point and rising slowly a certain period of time will elapse before the danger point is reached. On the other hand the temperature may be comparatively low but rising at a rapid rate, in which case the danger point will be more quickly reached. An instrument that is competent under such conditions must, therefore, necessarily be capable of responding both to the rate of change of the temperature as well as the temperature itself, and must be able to take into account and correlate both value and rate to give a signal and/or operate a control when a set of conditions arises that will cause the danger point to be rapidly approached.

It is an object of my invention to provide an instrument with these desirable characteristics. The instrument of my invention will correlate the rate of temperature change with the existing temperature and give a signal when the value of each is such that, when taken with the other, the approach of the danger point is imminent. The instrument of my invention will also operate a control, when such a set of conditions arises, to reduce the above mentioned supply of air and, if desired, operate a second control to admit a temperature reducing agent.

It will be apparent to those skilled in the art that although in the following description I have used temperature and rate of temperature change as the variables to which the instrument is responsive, that the instrument may also be used to measure other variables such as, for example, as pressure in the chamber in which the process is carried out, and may be used with other processes if desired.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figures 1, 2:
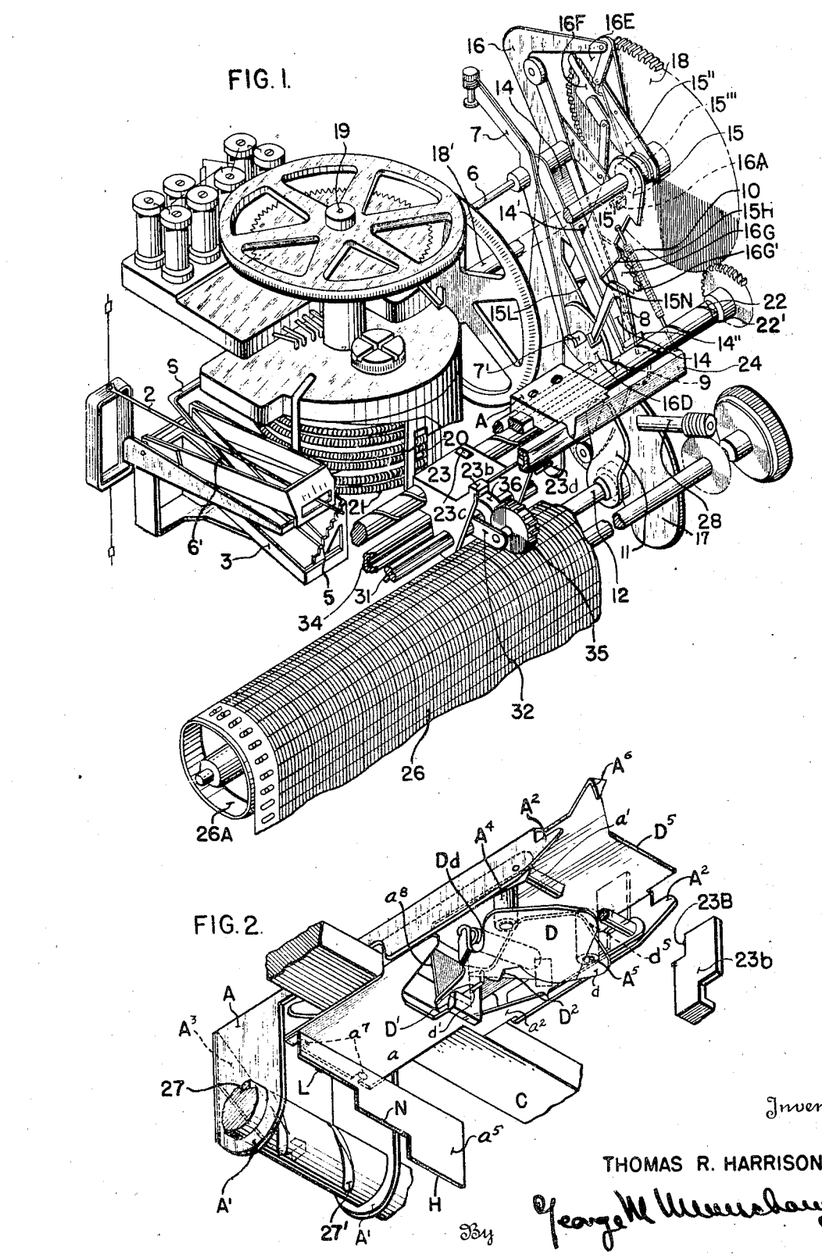
Fig. 1 is a perspective view of certain details of my instrument.
Fig. 2 is a perspective view of the control table.

The recording potentiometer instrument shown in perspective in Fig. 1, and significant operative parts of which are illustrated therein include a galvanometer, the pointer 2 of which deflects in response to a condition of unbalance in the potentiometer measuring circuit, which may be any well-known form including the resistance 21 which may be adjusted to rebalance the potentiometer. The instrument also comprises mechanical relay provisions operated by a constantly rotating driving motor (not shown) and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions, the instrument shown is of the form disclosed in Patent No. 1,946,280, dated February 6, 1934, by Thomas R. Harrison, and in respect to the type of control mechanism employed herein, I make use of certain instrumentalities to be later disclosed.

The control provisions which, in their construction and arrangement, and in this combination with the above-mentioned rebalancing and carriage adjusting and control mechanism, constitute the features of the present invention, includes a control table, A. The control table A is normally stationary but may be adjusted along the path of movement of the carriage 23. The position of the control table along said path corresponds to, and determines the normal value of the quantity being measured, while the position, at any instant, of the carriage 23 corresponds to, and constitutes a measure of the current value of said quantity.

The mechanism of the instrument of Fig. 1 through which the deflection of the galvanometer pointer 2 controls the adjustments of the recorder carriage 23 and the rebalance of the potentiometer circuit on a variation in the quantity or value measured by the galvanometer comprises a pointer engaging and position gauging element 3. The latter is pivotally supported and, in connection with the hereinafter mentioned shaft 6, has a loading tendency which may well be due partly to spring and partly to gravital action, to turn upward into the position in which one or another of the shoulders 5 of the member 3 engage the pointer 2. The element 3 is engaged by, and turns with the arm 6' of a rock shaft 6. A spring 10 tends to hold a rocker 8, which is journaled on a pivot 9, in the position in which the rocker engages an arm 7 secured to the shaft 6, and thereby holds the latter in a position in which the shoulders 5 are all below the pointer 2.

A cam 11, which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7, thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journaled on the shaft 6, and has a gravitational loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15H, 15N and 15L of a locking member 15 engages the bottom wall of a slot 14' in the member 14, and thereby frictionally holds the latter in the position occupied by it when such engagement occurs. When the pointers 2 and 14 occupy their neutral positions, the shoulder 15N of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15L. When the galvanometer pointer deflects in the opposite direction from its neutral position, as it does when the actual value of the quantity measured is higher than that indicated by the existing potentiometer adjustment, the pointer 14 is engaged and locked by the shoulder 15H of the member 15. The locking part 15 is given a tendency to move into locking engagement with the secondary pointer 14 by the spring 10, but is periodically held out of such engagement by the action on its projection 15' of the projection 16A carried by a ratchet lever 16 pivoted at 16B.

A spring 16H gives the lever 16 a tendency to turn forward in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which is occupied when the galvanometer pointer 2 is in its neutral position.

The position assumed by the part 15, when in locking engagement with the secondary pointer 14, controls the action of the pawls 16E and 16F by virtue of the fact that the collar or hub portion 15''' of the part 15 carries a spring pawl engaging arm 15''. The movement of the locking part 15 into position in which its shoulder 15H engages the secondary pointer 14 causes the arm 15'' to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15L engages the secondary pointer 14, the arm 15'' shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14, and thereby arrest the forward movement of the ratchet lever 16. In the neutral position of the galvanometer pointer and secondary pointer 14, the projection 14" of the latter engages the central shoulder 16G' of the arm 16G and the lever 16 is then held against any operative movement in the clockwise direction. When the secondary pointer position is more or less to one side or the other of its neutral position, the portion 14" engages an upper or lower shoulder on arm 16G more or less distant from the central shoulder 16G', and the lever 16 is then permitted more or less forward movement.

The rotation of the wheel 18 in one direction or the other effects corresponding potentiometer rebalancing adjustments and position adjustments of the recorder carrier 23. The rebalancing adjustments are affected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the galvanometer pointer to its neutral position.

The rotation of the wheel 18 adjusts the recorder carrier 23 by virtue of the fact that the teeth of the wheel 18 are in mesh with the teeth of a gear 22a carried by a carriage adjusting shaft 22 which is formed with a thread groove 22' of coarse pitch which receives a cam or mutilated screw thread rib secured to the carriage 23, so that the latter is moved longitudinally of the shaft 22 as the latter is rotated.

The recorder carriage 23 comprises a piece of sheet metal bent to form a flat upper surface and a pair of side members provided with openings through which extends the threaded shaft 22. Projecting forwardly from the carriage are a pair of tongues 23b that ride on the surface of a channel member 24 extending between the side plates of the instrument. The member 24 cooperates with the shaft 22 to support and guide the printing carriage and may also have a scale attached to its front surface having indicia on it that, along with a pointer 23d on the carriage, will indicate the present value of the condition.

The side members of the carriage 23 are also provided with another pair of aligned openings through which extends a splined shaft 31 for a purpose to be later described. Mounted for rotation around the shaft 31 and between the side members is a yoke 32 that has projecting from its rear end a roller 33 that rides in the groove of a channel member 34. A print wheel 35 is journaled between the front ends of the yoke. The print wheel has raised printing characters on its surface that are brought into printing engagement with the surface of a chart 26 at periodic intervals by an upward movement of the channel bar 34. Ink is supplied to the characters on the print wheel by means of their engagement with the surface of an ink wheel 36 that is located between the arms of yoke 32 and rotatable with the shaft 31. After each printing operation the shaft 31 is rotated to turn the ink wheel 36 and by means of that wheel, either through gearing or frictionally, to turn the print wheel 35 to bring the next printing character into position above the chart.

The record sheet 26 passes over and is given feeding or advancing movements by a record feedroll 26A. The latter is intermittently rotated by means of a worm and screw connection between the shaft of the roll 26A and a transverse shaft 28. Shaft 28 is intermittently actuated by means of a ratchet and lever device 30 which is engaged and oscillated by the arm 8' of the rocker 8 on each oscillation of the latter.

As was stated above, the shaft 31 is periodically rotated to bring a new printing character into printing position above the chart. This is accomplished by means of a mechanism now to be described. Mounted on an extension of the drive roll shaft 26A is a ratchet 37 which has rotatable with it a cam 38 carrying pins 39 (see Fig. 3). The ratchet is periodically rotated by means of a pawl 40 that is pivotally mounted on a plate member 41 which is rotatable on the shaft 26A and normally biased in a counterclockwise direction by a spring 42 into engagement with a stop 43. Upon each cycle of the instrument the pin 8' on lever 8 engages the end of member 41 and by means of the pawl 40, rotates ratchet 37 for a distance of one tooth, retrograde movement thereof being prevented by the pawl 44.

Figures 3, 7:
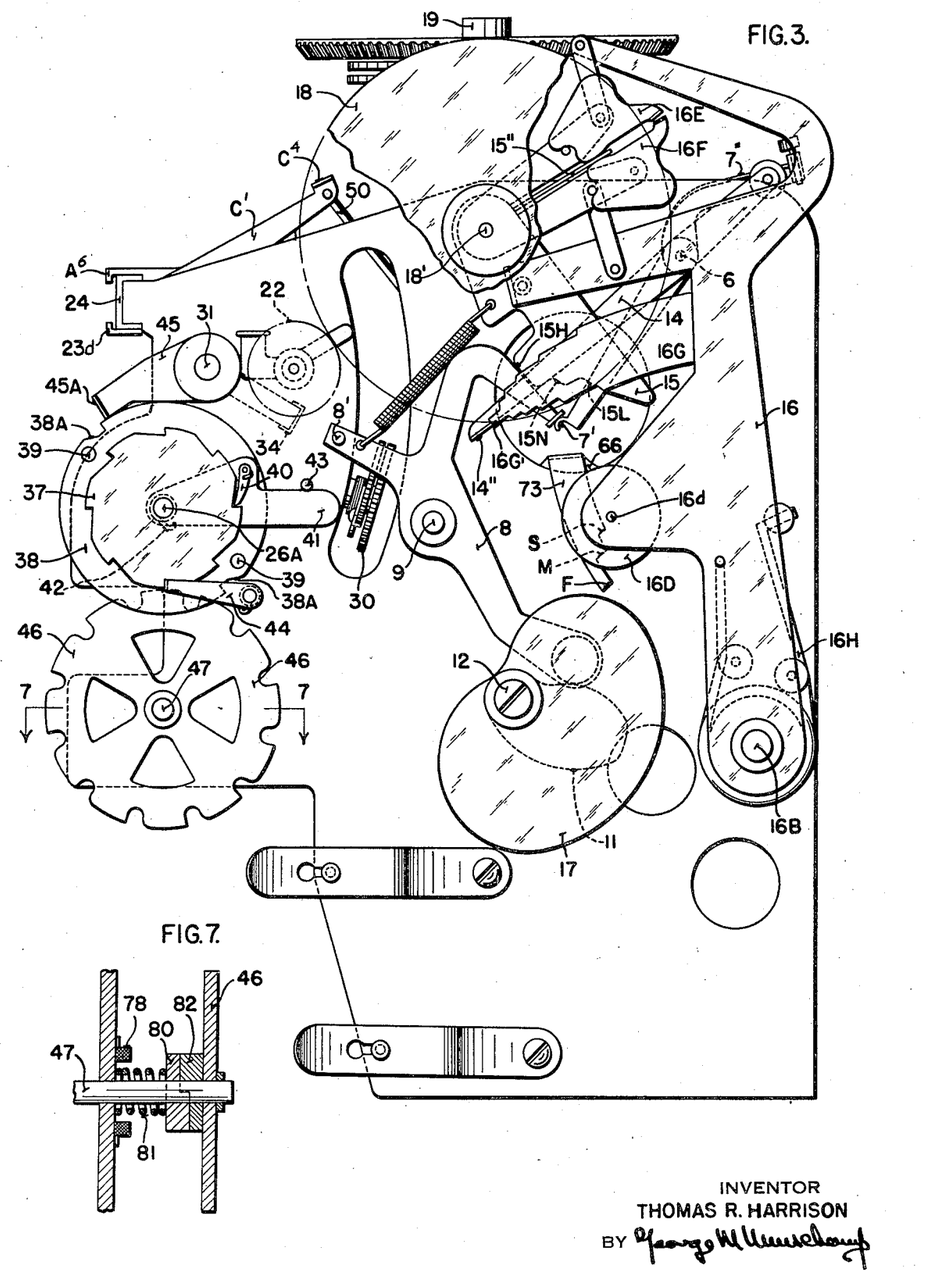
Fig. 3 is an outside view of the right-hand side plate of the instrument.
Fig. 7 is a view taken on line 7—7 of Fig 3.

As the ratchet 37 rotates it brings the cutout portions 38A of cam 38 under an edge 45A of the lever 45 that is journaled on shaft 31. The journal of this lever extends through the side plate of the instrument and the lever is extended rearwardly, as shown by dotted lines, into engagement with the channel member 34. Therefore, when the cutout portions 38A come under edge 45A the channel member is permitted to move upwardly to bring a character on wheel 35 into engagement with the chart. The same movement of ratchet 37 will bring the following edge of the cutout portion 38A of the cam under edge 45A to raise the lever 45 slightly and therefore move the printing character away from the chart to prevent blurring of the record mark. As shown the ratchet 37 has eight teeth and the cam 38 has two cutout portions therefore the printing will take place every four cycles of the instrument. This can, however, be varied as desired.

As the cam 38 is rotated the pins 39 periodically move a toothed wheel 46 journaled on a shaft 47 that extends entirely through the instrument. The other end of shaft 47 is geared to a selector switch and to the shaft 31, as is more fully shown in the application of Coleman B. Moore, Ser. No. 223,826, filed August 13, 1938. The arrangement is such that after each printing operation the shaft 47 is rotated, by means of one of the pins 39 and the wheel 46, to rotate shaft 31 and bring a new printing character into printing relation with the chart, and to connect another thermocouple with the instrument. This specific construction forms no part of my present invention and as it is a well known form of mechanism it is not believed that it is necessary to go more into the details of its construction in this case.

The control table A of the instrument shown in Figs. 1 and 2 comprises a sheet metal frame having ear portions A' apertured for the passage of the shaft 27 mounted in the instrument framework alongside the shaft 22, and having bearing parts $A^2$ which engage and slide along the upper flange of the rail 24. To facilitate the adjustment of the control table A along the path of travel of the pen carriage 23, the shaft 27 is shown as formed with a thread groove 27' which is adapted to receive a cam or mutilated thread rib part $A^3$ that may be secured to the control table frame. The shaft 27 may be rotated to adjust the control table in any suitable manner, as by means of a transverse shaft geared to the shaft 27 and rotated by an operating handle or knob at the front of the instrument. An index $A^6$ in conjunction with a scale on the front face of the rail 24 may indicate the adjustment of the table and the corresponding normal value of the quantity measured.

A member $a$ is hinged at one edge to the frame of the control table A by a pivot or pintle shaft $a'$ extending parallel to the shaft 27. The member $a$ is formed with guiding provisions including a part $a^2$ for a bar-like part C which extends parallel to the shaft 27 and is rigidly secured at its ends to arms C' at opposite ends of the instrument which are pivotally connected at $C^3$ to the instrument framework, so that the yoke like structure formed by the bar C and arms C' may turn with respect to the instrument framework about an axis coinciding with that of the hinge connection $a'$, between the table A and part $a$. The part $a$ and bar C are held by the said guiding provisions against independent turning movements about the axis of their respective pivotal supports. The part $a$ and bar C have a gravitational tendency to move from their highest positions, shown in dotted lines in Fig. 4, counter-clockwise around $a'$ into or toward their lowermost or full line positions. Their movement downward below their last-mentioned positions is prevented by the engagement of a projection $C^4$ from the arm C' with an adjacent portion of the instrument framework. The extent to which the parts $a$ and C are permitted to swing downwardly from their positions depends upon the relative positions of the table A and the recorder carriage 23. When the value of the quantity measured is so low that the carriage 23 is entirely at the low side (left-hand side as seen in Fig. 1) of the control table A, the carriage 23 permits movement of the parts $a$ and C to their lowest position. When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. When an increase in the quantity measured results in a movement of the recorder carriage 23 to the high side of the control table A, that movement causes the part $a$ to be positively secured against down movement from its uppermost position by adjusting a latch member into its latching position. The manner of accomplishing this will now be described.

The part $a$ has a carriage engaging portion $a^5$ secured to it, as shown in Fig. 2, which is formed with steps H, N and L that are adapted to be engaged by the roller $23c$ on carriage 23. A latch D on table A secures the part $a$ in its upper position. The latch D is pivotally mounted on a stud $A^4$ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection $23b$ at the low side front corner of the recorder carriage frame, a member $d$ pivotally mounted on a stud $A^5$ depending from the underside of the control table frame alongside the stud $A^4$, and a spring $Dd$ connecting the members D and $d$. The spring $Dd$ tends to move the member D in the counter-clockwise direction, as seen in Fig. 2, and to move the member $d$ in the opposite direction about their respective pivotal supports $A^4$ and $A^5$; such turning movements of the members D and $d$ are prevented by the engagement of the finger portion $d'$ of the part $d$ with the shoulder D' of the member D, when the latter is in its latching position, as shown in Fig. 2. In the non-latching position of the member D, the finger $d'$ engages a shoulder $D^2$ of the part D.

The members D and $d$ are moved from the latched position shown in Fig. 2 into the unlatched position and back again into the position by the engagement of the recorder carriage shoulder 23B with the cam shaped front edges $D^5$ and $d^5$ of the members D and $d$, respectively. The edges $D^5$ and $d^5$ are so respectively shaped and disposed that as the carriage moves to the high side of the control table, the shoulder 23B acts on the edge $d^5$ to turn the member $d$ counter-clockwise, so that the spring $Dd$ may then move the member D into its latching position in which its shoulders D' engages the finger $d'$. When the carriage 23 subsequently moves back from its high position, the shoulder 23B engages edge $D^5$ of the member D and moves the latter into its non-latching position while permitting the spring $Dd$ to move the member $d$ into the position in which its finger $d'$ engages the shoulder $D^2$ of the member D and holds the latter in its non-latching position.

The parts $a$ and C are positively held in their uppermost positions by the action of a spring 48, except during the portion of each revolution of the shaft 12 when the cam 11 renders the spring 48 inoperative to prevent such movement, as is hereinafter described. The extent to which the parts $a$ and C are permitted to swing downwardly from their uppermost positions during each period when the action of the cam 11 renders the spring 48 temporarily inoperative, depends upon the then relative positions of the table A and the recorder carriage 23. When the value of the quantity measured is low enough so that the carriage 23 is entirely at the low side (left-hand side as seen in Fig. 1) of the control table A, the carriage 23 does not interfere with the movement of the parts $a$ and C into their lowermost positions.

When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23.

The means through which the spring 48 normally prevents movement of the control table part $a$ out of its clearance position, and through which the rising and falling movements of the bar C and part $a$ effect control functions, include a floating member 49 connected by a link 50 to the arm C', and parts associated with the member 49. The latter is pivotally connected at 51 to the part 52 of a compound lever comprising parts 52 and 53 each pivoted to the instrument framework at 54 and normally held against relative movement by a spring 55. The latter tends to hold the part 52 in engagement with a projection 56 of the part 53, but serves as a safety device which may yield to prevent injury of the parts in case the switch parts actuated by the member should jam. The spring 48 extends between the upper end of the lever part 53 and the instrument framework, and tends to hold the parts 52, 53 and 49 in the positions shown in dotted lines in Fig. 4. The lever part 53 is moved from the dotted line position into the full line position of Fig. 4 once during each rotation of the shaft 12, by the cam 11, which then engages a cam roll follower 57 carried by the lever part 53.

Figure 4:
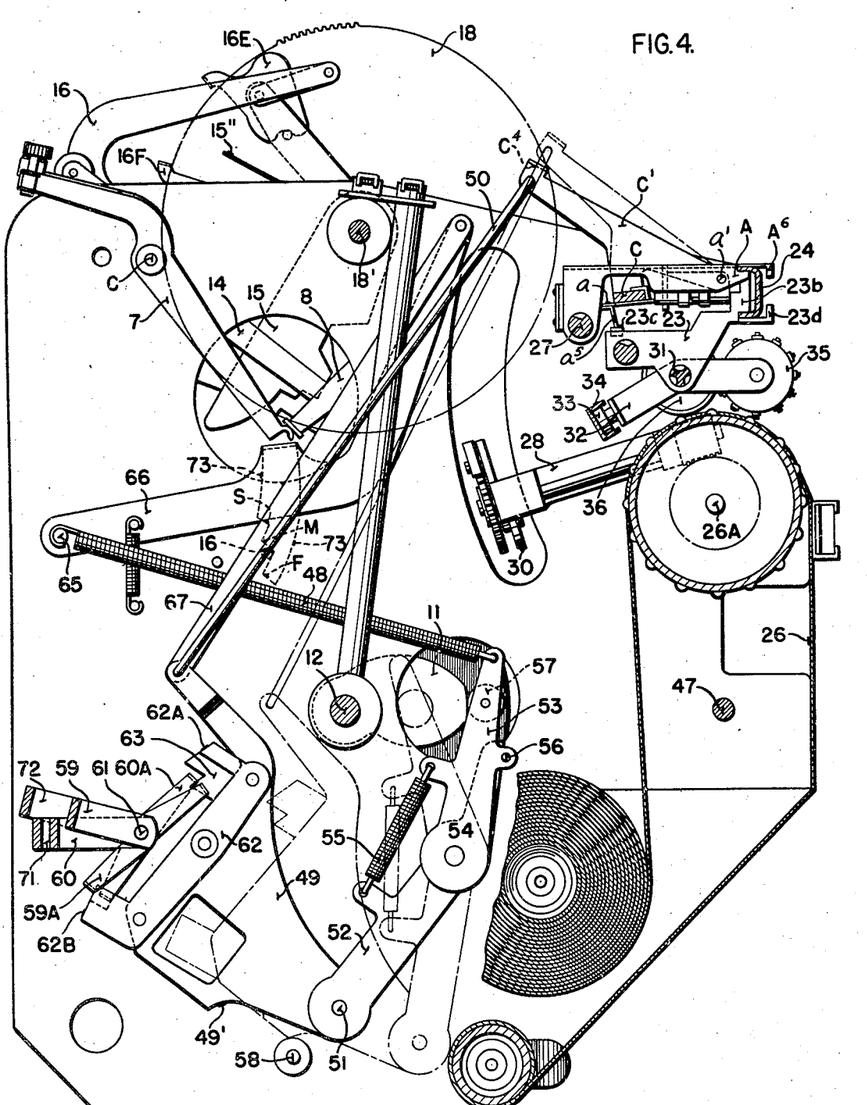
Fig. 4 is an inside view of the right-hand side plate showing some of the control provisions.

When the parts are in the positions shown in dotted lines in Fig. 4, the lower cam edge 49' of the member rests upon a roller support 58 mounted on the instrument framework, and the position of the member 49 is then such that the link 50 holds the part C' and thereby the bar C and control table part a in their uppermost positions. When the lever part 52 is turned in the clockwise direction from its Fig. 4 dotted line position, the weight of the part 49 adds to the gravital tendency of the bar C and table part a to turn downward, and the parts last mentioned then move downward into the position shown in full lines in Fig. 4, unless such movement is prevented by the control table latch D, or by the engagement of the edge $a^5$ with the recorder carriage shoulder 23C.

The movement of the member 49 to the full line position of Fig. 4 is used to move control switches E and F by turning the switch supporting frames 59 and 60 around their stationary supporting shaft 61. The frame 59 is so turned by engagement of one of the fingers of a yoke member 62 carried by the member 49 with an arm 59A formed on the frame 59. The frame 60 is turned by engagement on one of the fingers of a yoke member 63, also carried by the member 49, with an arm 60A formed on the frame 60. It is noted that each of the switch supporting frames 59 and 60, as well as two other switch supporting frames to be later described, are held in their adjusted positions on shaft 61 by spring washers 64. The switches E and F mounted on the frames 59 and 60 are of the mercury switch type in which the switch consists of a glass container having a quantity of mercury in it that is adapted to bridge various of the contacts extending into the container, depending upon the angular position of the latter.

Figures 5, 6, 8, 9:
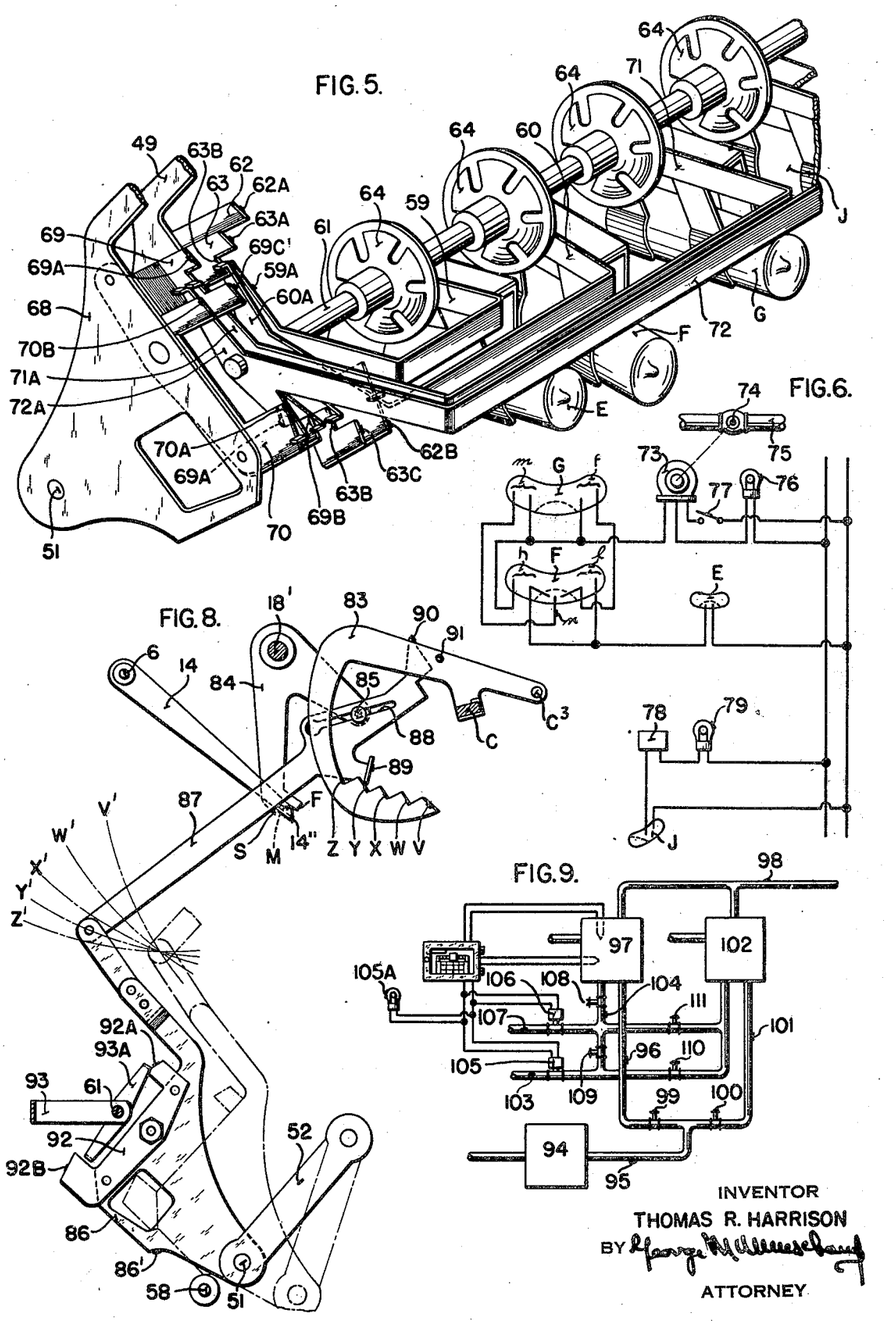
Fig. 5 is a perspective view showing the mounting of the various control switches.
Fig. 6 is a wiring diagram.
Fig. 8 is a view of a modified form of switch actuating mechanism.
Fig. 9 is a diagrammatic view of one type of apparatus in which my instrument is valuable.
Figure 5A:
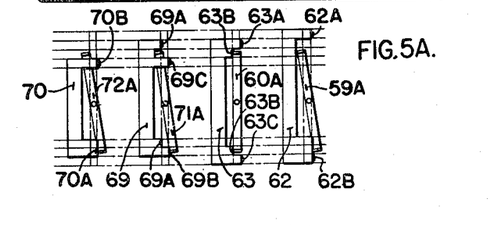
Fig. 5A is a view of the switch actuating fingers.

It will be noted that as the value of the condition being measured becomes smaller the print wheel carriage 23 moves to the left in Fig. 1. If the carriage and its roller 23C are to the left of step L on the member $a^5$ bar C will be permitted to move to its lowest position as member 49 moves to its full line position of Fig. 4. This will permit the finger 62A to engage the upper part of arm 59A and rotate frame 59 counter-clockwise in Fig. 4 and clockwise in Fig. 5 to open the switch E. As the value of the condition increases the roller 23C will fall under one of the steps L, N or H of the part $a^5$. In such a case the member 49 will be held in successively higher positions on its movements to the left in Fig. 4. When any of the steps of part $a^5$ engage the roller 23C the member 49 will be raised enough so that finger 62B of yoke 62 will engage the lower end of arm 59A and will rotate frame 59 clockwise in Fig. 4, or counter-clockwise in Fig. 5 to close E, as shown in Fig. 5. Thus it will be seen that E is open when the value of the condition is so low that the carriage 23 is entirely below or to the left in Fig. 1 of the control table A, and the switch E is closed whenever the value of the condition has increased to a point where the roller 23C will come under one of the steps on part $A^5$ of the control table, or is on the high side of the control table.

The yoke 60, whose fingers move switch F, is also mounted on the member 49. The fingers of this yoke are so arranged that the switch F will be given one of three positions depending upon whether the roller 23C is engaged by step L, N or H of part $a^5$. If 23C and L engage the member 49 will be moved to a low position and finger 63A will engage the upper part of arm 60A to move frame 60 counter-clockwise in Fig. 4 or clockwise in Fig. 5. When the value of the condition is such that 23C engages step N, member 49 will be positioned at such a height that portions 63B of the yoke 63 will engage arm 60A and shift that arm and its frame to an intermediate position as shown in Fig. 5. When the condition is such that the roller 23C is engaged by step H the member 49 will be held in a high position and finger 63C will engage the lower end of arm 60A and move frame 60 clockwise in Fig. 4 or counter-clockwise in Fig. 5. The switch F is provided with five contacts such as is shown in Fig. 6 so that a different circuit will be closed in each of three positions assumed by this switch.

From the above description it will be seen that the switches E and F will be moved to various positions depending upon the value of the condition being measured. The value at which the switches will be moved may be varied at will by adjusting the position of the control table A relative to the chart or by varying the width of the steps L, N and H on the part $a^5$. For example, if it is desired to actuate signals or controls as the temperature in a catalytic chamber progressively reached 975°, 990° or 1000° the steps on part $a^5$ could be made of such width and the control table A so positioned that as the carriage 23 moved to positions indicating those temperatures, the roller 23C would be under the proper step. In this manner member 49 is held at the right height to properly position the switches E and F in accordance with the temperature of the chamber.

It is also desirable to have a control or signal actuated in response to rate of change in the chamber as well as its value or magnitude. If the temperature of a chamber is high and rising fast it will reach a dangerous value sooner than if it is low and rising fast or high and rising slowly. In order to take care of such situations I also provide rate responsive instrumentalities on my instrument.

Pivoted to the right side plate of the instrument at 65 is an angularly shaped lever 66 whose upper end is connected to a link 67. The lower end of the link 67 is connected to a member 68 similar to member 49 and also pivoted at 51 on lever 52. This member, as shown in Fig. 5, also carries two yoke members 69 and 70 that are adapted to move switch carrying frames 71 and 72 around the shaft 61. The lever 66 is raised and lowered to vary the elevation of member 68 as it is moved to the left in Fig. 4 in response to the rate at which the condition is changing.

The lever 66 is provided with a laterally extending arm 73 that is bent over and extends through an opening in the side plate. The lower end of the arm is formed with three steps F, M and S that are adapted to cooperate with an extension of the shaft 16d upon which the cam follower 16D is mounted. It will be remembered that the counter-clockwise movement of lever 16 in Fig. 3 is limited by the engagement between edge 14″ of the secondary pointer and one of the steps on the member 16G. If the galvanometer pointer is deflected a smaller or larger distance from neutral it is an indication that the rate of change of the condition is small or large, respectively. This in turn, for a small rate of change, will cause the edge 14″ to engage a step near the step 16G′, and for a larger rate of change, to engage a step more remote from the step 16G′. Therefore, if the rate of change of the condition is small the pin 16d will be engaged by step S of the arm 73. In a like manner as the rate of change increases the pin 16d will move further to the left in Fig. 3 and successively be engaged by steps M and F.

As the steps S, M and F engage the pin 16d the member 68, through link 67, will be held higher on its pivot 51 so that various fingers formed on the yoke members 69 and 70 may turn the frames 70 and 71 and switches G and J carried thereby to different positions. If the rate of change is slow fingers 69A will engage the arm 71A and turn yoke 71 to a neutral position in which neither set of contacts of switch G are closed. If the rate of change is medium the member 68 will be raised so that finger 69B will engage the lower end of arm 71A forcing the upper end of said arm between fingers 69A and 69C as shown in Fig. 5. The frame 71 will then be rotated around shaft 61 in a counter-clockwise direction in Fig. 5 to close the contacts in one end of the switch G. If the rate of change is larger the member 68 will be raised still further and finger 69C will engage the upper end of 71A to rotate frame 71 clockwise in Fig. 5 to close the contacts in the other end of switch G.

A fourth switch is provided on frame 72 that is opened when the rate of change is small or medium by engagement between finger 70A of the yoke 70 and the lower end of arm 72A of frame 72 as shown in Fig. 5. This switch J is closed when the rate of change of the condition is fast by engagement between finger 70B of yoke 70 and the upper end of arm 72A of frame 72.

From the above it will be seen that switch G is moved into one of three positions depending upon whether the rate of change of the condition is fast, medium or slow. At the same time the switch J is moved to one of two positions depending upon whether the rate of change of the condition is fast or is medium or slow.

An instrument having the control provisions of this case can be used to measure the temperature of, for example, a chamber used in some type of catalytic process in which after a period of time the catalyst becomes contaminated and the temperature will rise rapidly to the detriment of both the retort and the catalyst. It is desirable to have some signal operated and to cut off the supply of heat as the temperature of the chamber approaches the danger point. There is shown in Fig. 6 a wiring diagram of the manner in which the switches above described may be connected to accomplish their signaling and control functions. In Fig. 6 there is also shown a reversible control motor 73 that is used to adjust a valve 74 in a supply line 75 for the heat supplying medium or a cooling medium leading to the chamber under control and a signal lamp 76.

As was above mentioned the instrument is of the multiple recording type that may in the usual manner measure and record the temperature at various points in the chamber in sequence. If the temperature at any point is of a given value the controls will be actuated in the same way, so for purposes of the following description it will be assumed that the instrument is measuring only one temperature.

If the temperature being measured is so low that the carriage 23 is entirely to the left of the control table A in Fig. 1, the member 49 will be moved through such a path that switch E will be opened by finger 62A of yoke 62 and the control and signal apparatus will be disconnected from the line. As the temperature rises, however, switch E will be closed and contacts i of switch F will be closed. If the rate of change of the temperature is slow or medium no circuits will be closed since for slow rate of change the switch G is in its intermediate position and the mercury does not bridge any of its contacts, while for a medium rate of change the contacts M are bridged. This latter closes no circuit to the other side of the line. If the temperature is low and the rate of change is fast the contacts l of switch F and contacts f of switch G will be closed and a circuit will be completed through one field of the motor 73 and the signal light 76. The motor will therefore start to close the valve 74 and continue to do so until the temperature falls or the rate of temperature change slows down. At the same time the lamp 76 will indicate that such an operation is taking place.

If the temperature reaches a value where roller 23C is engaged by step N the switch F will have its contact n bridged with one of the contacts l and one of the contacts h by the mercury. In such a case if the rate of temperature change is slow no control or signal will be made. If, however, the rate of change is medium the contacts m of switch G will be closed and a circuit will be completed through the right contact h, contact n, contacts m, motor 73 and lamp 76 to the other side of the line. If the rate of change is rapid a circuit will be completed through the right contact h, the left contact l, contacts f, motor 73 and lamp 76.

If the temperature is so high that roller 23C is under step H of part $a^5$ a circuit will be completed directly through contacts h to the motor and lamp. Therefore, the motor 73 will be driven to close the valve 74 when, (a) the temperature is low and the rate of change is fast, (b) the temperature is medium and the rate of change is medium or fast, and (c) at all times when the temperature is high. The signal lamp will be lit under each of these circumstances to indicate that the control is being operated. A switch 77 is provided in the second field of motor 73 so that the motor may be manually operated in a direction to open the valve 74.

At all times when the rate of change of the temperature is fast it is desirable to be constantly informed as to its value in that particular portion of the chamber. It is for this reason that the switch J is provided. When the rate of change is fast the switch J is closed to complete a circuit from one side of the line through a solenoid 78 and a lamp 79 to the other side of the line. The solenoid 78 is used to move a clutch member 80 on the shaft 47 (see Fig. 7) against the force of a spring 81 to disconnect the toothed wheel 46 from the shaft 47. The clutch member 80 is keyed to shaft 47 and is normally biased into engagement with a complementary faced member 82 attached to the wheel 46 so that rotation of the latter will be imparted to the shaft to accomplish the switching and print wheel rotating operations. When, however, solenoid 78 is energized member 80 is moved against the bias of spring 81 into engagement with the face of the solenoid. This acts to disconnect the shaft 47 from its drive wheel 46 and at the same time acts as a brake to prevent rotation of the shaft. In this manner, whenever the rate of temperature change is fast, the instrument selecting mechanism is disconnected so that a continuous temperature record is made of that particular portion of the chamber. The clutch faces 80 and 82 are so shaped that they may only engage when one of the cutout portions 38A of cam 38 has moved under edge 45A to perform a printing operation, in order to insure that the printing and switching operations are always synchronized.

In some cases it may be desirable to obtain the control function by the use of one switch instead of two as has just been described. This may be accomplished by the apparatus shown in Fig. 8. Switches corresponding to E and J may be operated, if desired, in a manner similar to that already described.

In this embodiment of the invention as the bar C assumes its three positions depending upon the position of the roller 23C on the print wheel carriage relative to the steps L, N and H of the control table A a curved member 83, taking the place of arm C', will be moved to one of three positions around the pivot point C³. The member 83 is formed on its lower end with five steps that are lettered for convenience V, W, X, Y and Z, and which cooperate with a member that is responsive to rate to properly position a switch pusher finger.

From the above description of the relay mechanism it will be remembered that as the condition being measured is rising the galvanometer pointer moves to the left of its mid-position in Fig. 1. Therefore, the faster the condition is rising in value the higher, or further in a counter-clockwise direction in Fig. 8, the secondary pointer 14 will move. The position of the secondary pointer is measured on each cycle of the instrument by a bell crank lever 84 which has on the end of one arm three steps $s$, $m$ and $f$ that engage the edge 14" of the pointer. This in turn means that a pin 85 projecting from the other arm of the bell crank will move lower as the rate of change of the condition increases. The respective positions of the stepped member 83 and the bell crank 84 when correlated serve to properly position the switch pusher member 86 that is pivotally mounted at 51 on lever 52 as were the previously described members 49 and 68.

A link 87 is pivotally connected at its lower end to the member 86 and is provided at its upper end with a slot 88 through which the projection 85 extends and an edge 89 adapted to engage with the steps formed on the curved arm 83. The link 87 is also provided at its extreme upper end with an edge 90 adapted to engage a pin 91 on lever 83 so that during its periodic movement from its full to its dotted line position the bar C and part $a^5$ will be lifted out of the path of roller 23C. This same movement of the link, through slot 88 and pin 85 will serve to move the bell crank out of the path of secondary pointer 14.

As previously described the downward movement of the link 87 is caused by the weight of the parts as the member 86 moves to the left in Fig. 8 and the cam edge 86' is formed with a sharp initial drop so that link 87 moves rapidly into contact with the stepped portion of arm 83 upon beginning of movement to the left of member 86. Further counter-clockwise movement of the member 86 with the edge 89 of the link in engagement with the step $y$ will result in the deflection of the member 86 over the path indicated diagrammatically as $y'$ in Fig. 8, of a plurality of paths of which in the present embodiment there are five. So long as the rate of change of the condition is slow the pin 85 will be in the position just described at the beginning of each downward movement of the link 87 and the particular step of the arm 83 engaged by the edge 89 will then be determined solely by the position of the pen carriage 23 with respect to the control table A, and therefore in accordance with the value of the condition. If the value of the condition is such that step N engages with the roller 23C the step Y will be positioned in the path of the edge 89 on the down movement of link 87, as shown. If the value of the condition is such that step L engages roller 23C the arm 83 will be positioned so that the steps are in a lower position than that shown and the step Z will then be positioned in the path of the edge 89. Upon a rise in magnitude of the condition so that step H engages the roller 23C, the arm 83 will be positioned so that its steps are higher than that shown and step X will be in the path of edge 89 upon downward movement of the link 87. As will be clear from Fig. 8 movement of member 86 to the left with edge 89 in engagement with steps V, W, X, Y and Z will result in member 86 deflecting over paths V', W', X', Y' and Z', respectively.

With the step $m$ in engagement with the edge 14" the pin 85 will be lower than the position in which it is shown thereby moving the edge 89 transversely of the path of the link 87 so that edge 89 is moved into alignment with a step of the arm 83 which is one step further removed to the high side than is the case when pin 85 is in the position shown. Thus with the arm 83 in its shown position and step $m$ of bell crank 84 in engagement with edge 14" of the secondary pointer, edge 89 will engage step X. In a like manner, if the step $f$ of the bell crank 84 is engaged with the edge 14" of the secondary pointer, the edge 89 of link 87 will engage step W of arm 83. It will be understood that by providing additional steps on the part $a^5$ and the bell crank 84 that the operation could be continued indefinitely, but for purposes of this invention, movement of the member 86 through five paths is sufficient.

Attached to the member 86 is a yoke 92 that has two switch tilting fingers 92A and 92B on it. The former finger is adapted to engage the upper end of arm 93A, that is formed on a switch supporting yoke 93, as the member 86 moves through paths Y' and Z'. The finger 92B engages the lower end of arm 93A as the member 86 moves through paths V', W' or X'. In this manner a switch mounted on frame 93 in a manner similar to the mounting of the switches shown in Fig. 5, will be tilted to one of two positions depending upon the path through which member 86 moves. The switch is preferably opened when arm 83A is engaged by finger 92B and closed when engaged by finger 92B.

The paths indicated in Fig. 8 which are selectively taken by the member 86 in accordance with the foregoing may conveniently be tabulated as follows in which temperature indicates the step of part $a^5$ that is in engagement with roller 23C and rate indicates the step of bell crank 84 in engagement with edge 14".

| Temp. | Rate | Path of 86 | Switch position |
|---|---|---|---|
| H | $f$ | V' | Closed. |
|   | $m$ | W' | Do. |
|   | $s$ | X' | Do. |
| N | $f$ | W' | Do. |
|   | $m$ | X' | Do. |
|   | $s$ | Y' | Open. |
| L | $f$ | X' | Closed. |
|   | $m$ | Y' | Open. |
|   | $s$ | Z' | Do. |

There is shown in Fig. 9 one type of apparatus in which the present invention is useful. In that figure oil to be treated is passed through chamber 94 and lines 95 and 96 to a catalyst chamber 97 and from there to exit line 98. As the oil is treated, a coating of carbon is deposited on the catalyst, which coating reduces its efficiency to a point where a valve 99 in the line 96 has to be closed and a valve 100 in a line 101 has to be opened to direct the oil through a second chamber 102. In order to remove the carbon from the catalyst in chamber 97 a stream of hot air is blown into it through pipes 103 and 104, which air in burning off the carbon raises the temperature in the chamber 97. A potentiometer having control provisions similar to those of Fig. 8 is used to measure the temperature of the chamber 97 at a plurality of points. Whenever the value of the temperature or its rate of change in combination with the present value reaches a point in which the rise in temperature is apt to harm the catalyst a switch actuated by the member 86 is closed to shut a solenoid valve 105 in the air line and to open a solenoid valve 106 in a steam line 107. The air is therefore shut off to stop the combustion process and the steam serves to cool down the chamber. A signal light 105A across the line may also be lighted when the switch is closed to indicate what is taking place.

By the time the carbon has been removed from the catalyst in chamber 97, that in chamber 102 will be in need of rejuvenation so valve 100 will be closed and valve 99 will be opened to redirect the fluid through chamber 97. At the same time valves 108 and 109 in pipe 104 will be closed to cut off the air and steam supply to chamber 97 and valves 110 and 111 will be opened to direct air and steam to chamber 102. The same potentiometer or, preferably, a second one will be used to control the carbon burning process in chamber 102.

From the above detailed description it will be seen that I have invented an instrument in which a plurality of switches or a single switch may be operated to control a condition in accordance with its value and the rate of change of the value. It will be obvious that by actuating the switches in different sequences from that shown, that different types of control involving both rate and magnitude may be obtained.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a measuring and control instrument the combination with means to normally measure the rate of change of a plurality of conditions in sequence, a member movable to one of a plurality of positions depending upon the rate of change of the condition being measured, control means operated by said member, and means actuated by said control means to maintain said instrument in measuring relation with one of said conditions when the rate of change of said condition exceeds a predetermined amount.

2. In the operation of an instrument for controlling the value of a condition in a space the method which comprises periodically measuring the rate of change of said condition at a plurality of points in sequence, controlling said condition in response to said measurements, and restraining the measurement to one point only when the rate of change of said condition exceeds a predetermined amount at said point.

3. In a control instrument, the combination with means positioned in accordance with the value of a condition, means positioned in accordance with the rate of change of said condition, switch actuating means movable through a path determined by the positions of said first two means, operating means for said switch actuating means, control instrumentalities operated by said movable means and means to render said control instrumentalities inoperative in response to a predetermined low magnitude of said condition.

4. In a control instrument the combination with control instrumentalities to regulate the value of a condition, means to measure the value and rate of change of said condition at a plurality of points, means to operate said control instrumentalities in response to said measurements, means to render said control instrumentalities inoperative upon a predetermined low value of said condition, and means to render said measuring means responsive to said condition at one point only when the rate of change thereof is of a predetermined magnitude.

5. In a control system for acting upon a material, means for supplying a heating agent, means for supplying a cooling agent, an instrument responsive to the temperature of said material and the rate of temperature change thereof, means operated to one position upon the attainment of a predetermined value of the temperature and a predetermined rate of change thereof and to another position upon the attainment of another value of temperature and a different rate of change, and an operating connection between said last mentioned means and said supply means.

6. In a control system the combination with means to control the value of a condition, a first member positioned in response to the magnitude of said condition, a second member positioned in response to the rate of change of said condition, a part actuated by said first member to render said control means operative upon the attainment of a predetermined magnitude of said condition, and means to thereafter actuate said control means in response to the positions assumed by said first and second members.

7. A measuring and control instrument adapted to sequentially measure the value of a condition at a plurality of points, a member movable to various positions in accordance with the value of said condition, a member movable to various positions in accordance with the rate of change of said condition, control means for said condition, means to operate said control means to various positions by said members, means to render said control means inoperative if the value of said condition is below a certain amount and means to render said instrument responsive to said condition at only one point if the rate of change is above a certain amount.

8. In a control system for a catalytic process means positioned in accordance with the value of one variable in the process, means positioned in accordance with the rate of change of said variable, mechanism to combine the results determined by said first two means, control means to alter the character of said measured variable, and means to adjust said control means to various positions in response to the determination made by said mechanism, said mechanism comprising a member movable through a plurality of paths dependent jointly upon the magnitude of the condition and its rate of change.

9. In a control system the combination of means to measure the value of a variable condition, a part moved to a position dependent upon the measurement made by said means, a second means responsive to variations in the rate of change of said condition, a second part moved to positions dependent upon the value of the rate of change of said condition, control means for said condition, means operated by the first part to disconnect said control means if the condition is to one side of a predetermined value, and means to adjust said control means responsive to the positions of said first and second parts.

THOMAS R. HARRISON.